United States Patent [19]
Anderson

[11] Patent Number: 5,911,883
[45] Date of Patent: Jun. 15, 1999

[54] FLOW-BY SOLID PHASE EXTRACTION METHOD

[75] Inventor: Dale R. Anderson, Lake Elmo, Minn.

[73] Assignee: Minnesota Mining and Manufacturing Company, St. Paul, Minn.

[21] Appl. No.: 08/725,886

[22] Filed: Oct. 4, 1996

[51] Int. Cl.⁶ .................................................. B01D 15/00
[52] U.S. Cl. ..................................... 210/679; 210/502.1
[58] Field of Search .................................... 210/679, 484, 210/493.1, 493.4, 494.1, 497.1, 502.1, 503, 504, 505

[56] References Cited

U.S. PATENT DOCUMENTS

| | | | |
|---|---|---|---|
| 3,173,862 | 3/1965 | Clements et al. | 210/661 |
| 3,338,992 | 8/1967 | Kinney | 264/24 |
| 3,509,009 | 4/1970 | Hartmann | 161/150 |
| 3,528,129 | 9/1970 | Hartmann | 18/8 |
| 3,759,391 | 9/1973 | Dreher | 210/494 |
| 3,809,613 | 5/1974 | Vieth et al. | 195/63 |
| 3,888,250 | 6/1975 | Hill | 128/214 R |
| 3,971,373 | 7/1976 | Braun | 128/146.2 |
| 4,092,246 | 5/1978 | Kummer | 210/65 |
| 4,153,661 | 5/1979 | Ree et al. | 264/120 |
| 4,431,542 | 2/1984 | Dingfors et al. | 210/502.1 |
| 4,437,271 | 3/1984 | McAvoy | 51/400 |
| 4,773,999 | 9/1988 | Schade | 210/315 |
| 4,810,381 | 3/1989 | Hagen et al. | 210/502.1 |
| 4,853,120 | 8/1989 | Frantz | 210/184 |
| 4,893,439 | 1/1990 | McAvoy et al. | 51/400 |

(List continued on next page.)

FOREIGN PATENT DOCUMENTS

| | | |
|---|---|---|
| 0105579 | 4/1984 | European Pat. Off. . |
| 0350252 | 1/1990 | European Pat. Off. . |
| 1402586 | 8/1975 | Germany . |
| 1584517 | 2/1981 | Germany . |
| 1597888 | 9/1981 | Germany . |
| WO93/22038 | 11/1993 | WIPO . |

OTHER PUBLICATIONS

Technical Information—"3M Empore™ Extraction Disks, A new standard for sample preparation," 78–6900–3736–7 (25.5)DPI ©3M 1995.
Technical Information—"3M Empore™ Extraction Disks, The environmental analysis standard," 78–6900–3735–9 (25.5)DPI ©3M 1995.
Technical Information—"3M Empore™ High Performance Extraction Disk Cartridges, A new standard for sample preparation," 78–6900–3737–5 (25.5)DPI ©3M 1995.

(List continued on next page.)

*Primary Examiner*—Ivars Cintins
*Attorney, Agent, or Firm*—Michaele A. Hakamaki

[57] ABSTRACT

A method for removing dissolved species from a fluid while allowing suspended solid particles to remain within in the fluid, where the fluid includes dissolved species and suspended solid particles. The method includes providing a solid phase extraction article comprising a first end, a second end opposite the first end, an axis extending from the first end to the second end, and a porous, particle loaded, fibrous sheet material formed into a spiral configuration about the axis. The sheet material is wound around itself to provide multiple layers of sheet material, each layer of sheet material is spaced from each adjacent layer of sheet material, and the sheet material comprises a first working surface, a second, opposite working surface, and an inner portion comprising active particles between the first and second working surfaces. The method further includes passing a fluid including dissolved species and suspended solid particles through the solid phase extraction article from the first end to the second end in an axial direction. The suspended solid particles preferably do not substantially obstruct the first or second working surfaces so that the fluid including dissolved species can reach the inner portion of the sheet material. The fluid also preferably contacts both the first and second working surfaces of the sheet material, and active particles contained within the sheet material remove the dissolved species from the fluid as the fluid passes through the solid phase extraction article.

29 Claims, 3 Drawing Sheets

U.S. PATENT DOCUMENTS

| | | | |
|---|---|---|---|
| 4,933,229 | 6/1990 | Insley et al. | 428/224 |
| 5,030,496 | 7/1991 | McGurran | 428/85 |
| 5,071,610 | 12/1991 | Hagen et al. | 264/120 |
| 5,082,720 | 1/1992 | Hayes | 428/224 |
| 5,120,331 | 6/1992 | Landy | 55/74 |
| 5,279,742 | 1/1994 | Markell et al. | 210/638 |
| 5,328,758 | 7/1994 | Markell et al. | 428/281 |
| 5,366,632 | 11/1994 | Balsimo et al. | 210/777 |
| 5,403,482 | 4/1995 | Steere et al. | 210/489 |
| 5,472,600 | 12/1995 | Ellefson et al. | 210/317 |
| 5,492,627 | 2/1996 | Hagen et al. | 210/651 |

OTHER PUBLICATIONS

Technical Information—"3M Empore™ Custom Applications, Setting new performance standards," 78–6900–3739–1 (94.2)DPI ©3M 1994.

Journal of Chromatography, 351 (1986), H. Figge et al., pp. 393–408.

Introduction to Modern Liquid Chromatography, Snyder and Kirkland, 2d Ed., John Wiley & Sons, Inc. (1979), pp. 172–177, 272–279, 326–333.

FLOW-BY SOLID PHASE EXTRACTION METHOD

TECHNICAL FIELD

The present invention relates to a method of and apparatus for out solid phase extraction from fluids that contain suspended or dispersed solid matter. More particularly, solid phase extraction may be accomplished by the use of a porous, particle web wound in a spiral about a central axis, wherein the fluid flows ally along the surfaces of the web.

BACKGROUND OF THE INVENTION

It is common to use solid phase extraction to remove dissolved species from a fluid, whether for analytic (small-scale) or purification (large-scale) purposes by means of a particulate-loaded porous web. Webs useful for such purposes include fibrillated polymeric webs (e.g., polytetrafluoroethylene (PTFE)), nonwoven polymeric webs (e.g., polyolefins, such as polyethylene and polypropylene), and wet-laid or polymer paper webs (e.g., webs prepared from fibrous pulp, such as cellulose, glass, aramid, or polyethylene fibers). Further, the particulate that is used in the particulate-loaded porous webs can be sorptive, reactive, or a combination of the two. Materials commonly used in these webs include, for example, activated charcoal, silica, alumina, silica coated by organic and inorganic materials, and poly(styrene-co-divinyl benzene).

However, when webs of the type described above are used in extractive processes where the carrier fluid comprises both dissolved species and suspended matter, pores in the webs may be quickly plugged with suspended matter, thereby requiring increased pressure to move the carrier fluid through the extractive process and decreasing the effectiveness of the web for removing dissolved species from the fluid. This plugging of web pores and resulting decrease in capability of the web for removing the dissolved species is referred to as web fouling. Examples of the fluids used in these extractive processes include blood or other physiological fluids, environmental fluids such as lake or stream water, and fruit juices containing pulp or other suspended matter. Methods that have been used to minimize web fouling include the use of glass bead prefilters (e.g., U.S. Pat. No. 5,366,632) and gradient density prefilters (e.g., U.S. Pat. No. 5,472,600) to prefilter suspended matter from the carrier fluid before it reaches the particulate-loaded porous web. Glass bead prefilters are superior in performance to traditional prefilter materials, such as diatomaceous earth, sand, cellulose or perlite expanded amorphous volcanic rock, in providing faster filtration times and decreased pressure drop. The beads are said to gain advantage due to features such a their spherical shape and inertness. Gradient density prefilters provide advantages due their capacity to separate a large amount and variety of suspended or interfering matter before an analyte comes in contact with the solid phase medium. In spite of these advantages, both types of prefilters can themselves become clogged, decreasing the efficiency of the extraction process. In large-scale industrial separation processes that require longer production run-times for each separation media change than are allowed by either of these prefilter means the separation processes are often limited by the length of time the prefilter means remain unclogged.

SUMMARY OF THE INVENTION

According to one aspect of the present invention, a method is provided for removing dissolved species from a fluid while allowing suspended solid particles to remain within in the fluid, where the fluid includes dissolved species and suspended solid particles. The method includes providing solid phase extraction article comprising a first end, a second end opposite the first end, an axis extending from the first end to the second end, and a porous, particle loaded, fibrous sheet material formed into a spiral configuration about the axis. In this article, the sheet material is preferably wound around itself, each layer of sheet material is preferably spaced from each adjacent layer of sheet material, and the sheet material comprises a first working surface, a second working surface opposite the first working surface, and an inner portion between the first and second working surfaces, where the inner portion comprises active particles. The method further includes passing a fluid including dissolved species and suspended solid particles through the solid phase extraction article from the first end to the second end in an axial direction. The suspended solid particles preferably do not substantially obstruct the first or second working surfaces so that the fluid including dissolved species can reach the inner portion of the sheet material. The fluid also preferably contacts both the first and second working surfaces of the sheet material, and active particles contained within the sheet material remove the dissolved species from the fluid as the fluid passes through the solid phase extraction article.

According to another aspect of the invention, the method further includes attaching a support layer of material to the particle loaded, fibrous sheet material. According to other aspects of the invention, the particle loaded sheet material may comprise fibrillated polytetrafluoroethylene or may comprise a nonwoven web selected from the group of materials consisting of polyamide, polyolefin, polyester, polyurethane, polyvinylhalide, glass fibers, ceramic fibers, or quartz fibers. In yet another aspect of the invention, the active particles are enmeshed in a porous fibrous membrane.

In this application:

"ceramic" mean nonmetallic, inorganic materials;

"lubricant" means water-based fluids and organic liquids or a combination thereof which are used to facilitate making of the composite article;

"matrix" means an open-structured entangled mass of microfibers;

"particles" or "particulate" means solid shapes (not including PTFE) having a diameter 0.1 to 200 micrometers, preferably 5 to 40 micrometers, with an aspect ratio from 1:1 to 1:1,000,000, in addition to particles as defined below;

"sorptive" means capable of taking up and holding by either absorption or adsorption; and "void volume" means the vacancies in the structure of a composite.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE PREFERRED EMBODIMENTS

Figure 1:
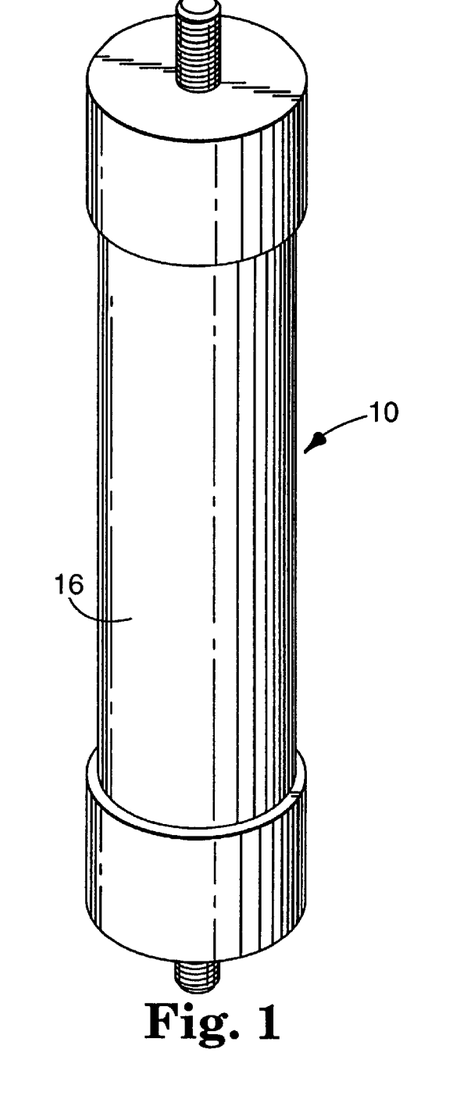
FIG. 1 is a perspective view showing one embodiment of a solid phase extraction article of the present invention.
Figure 1A:
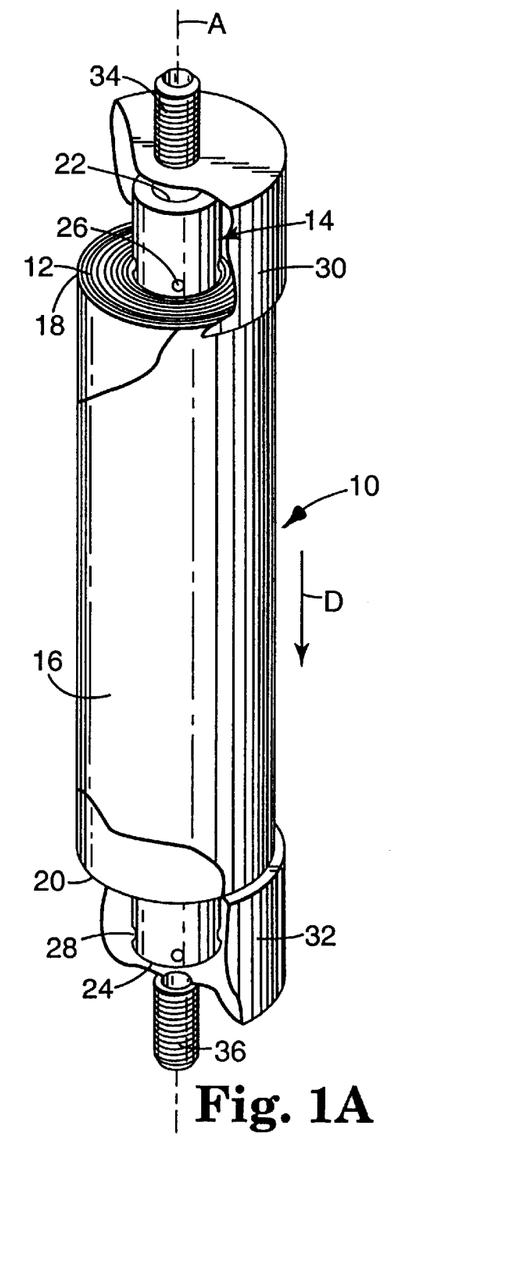
FIG. 1A is a perspective view of the embodiment of FIG. 1, with portions of the housing broken away to show some of the interior details.

Referring now to the Figures, wherein the components are labeled with like numerals throughout the several Figures, and initially to FIG. 1, one preferred embodiment of a solid phase extraction article 10 is illustrated. FIG. 1A is a view of the article 10 with portions broken away to show some of the interior details of the article. The basic components of the solid phase extraction article 10 include an elongated, porous, particle loaded, fibrous sheet material 12 spirally wound about a rod 14 having an axis A and surrounded by a housing 16. The housing 16 has a first end 18 and a second end 20 at the opposite end of the housing 16 in an ail direction from the first end. The rod 14 preferably has a first axial hole 22 drilled in the center of the rod end nearest the first end 18 and a second axial hole 24 drilled in the center of the rod end nearest the second end 20. The rod 14 preferably has a plurality of outlet holes 26 that are generally perpendicular to and intersect with the first axial hole 22. The rod also preferably has a plurality of inlet holes 28 that are generally perpendicular to and intersect with the second axial hole 24. Therefore, in this embodiment the first and second axial holes 22, 24 extend at least far enough into the rod 14 to intersect with the outlet holes 26 and inlet holes 28, respectively. As shown, the article 10 may also comprise a first end cap 30, a second end cap 32, an inlet 34, and an outlet 36. The inlet 34 and outlet 36 may be threaded to allow the article 10 to be attached to a fluid supply system, or may have some other configuration that allows the article 10 to be used in a solid phase extraction process.

Figure 2:
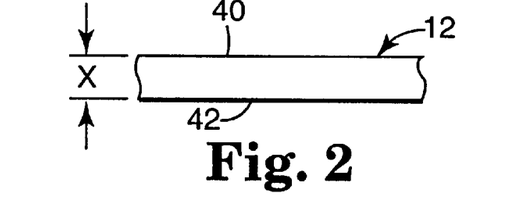
FIG. 2 is a cross sectional view of a porous, particle loaded, fibrous sheet material.

FIG. 2 illustrates a cross-sectional view of a portion of the elongated, porous, particle loaded, fibrous sheet material 12 which, as shown, preferably comprises a first working surface 40, a second working surface 42, and a thickness X between the first and second working surfaces 40, 42. The sheet material 12 preferably comprises a uniformly porous, high void-volume composite sheet comprised of particulate material distributed uniformly throughout a matrix formed of interentangled, fibrillated polytetrafluoroethylene (hereinafter referred to as PTFE) fibrils. More specifically, the sheet material 12 is a material of the type described in U.S. Pat. No. 4,153,661 (Ree at al.), which is commonly owned by the assignee of the present invention, the contents of which are incorporated herein by reference.

A preferred method for preparing the preferred PTFE sheet material of the invention comprises the steps of:

a) admixing lubricant (preferably water) with a blend comprising porous particulate and PTFE particles to form a soft dough-like mass, the lubricant being present in an amount to exceed the sorptive capacity of the particulate by at least three weight percent, said mass having a cohesive consistency, and the ratio of particulate to PTFE preferably being in the range of 40:1 to 1:4;

b) intensively mixing said mass at a temperature and for a time sufficient to cause initial fibrillation of said PTFE particles;

c) biaxially calendering said mass between gaps in calendering rolls maintained at a temperature and for a time, while closing the gap between the calendering rolls with each successive calendering operation, to cause additional fibrillation of said PTFE particles to form a self-supporting sheet having a void volume in the range of 30 to 80 percent and a mean pore size in the range of 0.3 to 5.0 micrometer, wherein said void volume and mean pore size vary directly with and are controlled by the amount of lubricant present during processing.

More particularly, preparation of porous fibrous sheet material can be as follows:

A. PTFE Sheet Material (Webs)

In one embodiment of the article of the present invention, an aqueous PTFE dispersion is used to produce a fibrillated web. This milky-white dispersion contains about 30% to 70% (by weight) of minute PTFE particles suspended in water. A major portion of these PTFE particles range in size from 0.05 $\mu$m to about 0.5 $\mu$m. Commercially available aqueous PTFE dispersions may contain other ingredients such as surfactants and stabilizers which promote continued suspension. Examples of such commercially available dispersions include Teflon™ 30, Teflon™ 30B, and Teflon™ 42 (DuPont de Nemours Chemical Corp.; Wilmington, Del.). Teflon™ 30 and Teflon™ 30B contain about 59% to 61% (by weight) PTFE solids and about 5.5% to 6.5% (by weight, based on the weight of PTFE resin) of a non-ionic wetting agent, typically octylphenyl polyoxyethylene or nonylphenyl polyoxyethylene. Teflon™ 42 contains about 32% to 35% (by weight) PTFE solids and no wetting agent (but does contain a surface layer of organic solvent to prevent evaporation).

The sheet material consisting fibrillated PTFE preferably is prepared as described in any of U.S. Pat. Nos. 4,153,661, 4,460,642, and 5,071,610, the processes of which are incorporated herein by reference, by blending the desired particulate into the aqueous PTFE emulsion in the presence of sufficient lubricant to exceed the sorptive capacity of the solid yet maintain a putty-like consistency. This putty-like mass is then subjected to intensive mixing at a temperature preferably between 40° and 100° C. to cause initial fibrillation of the PTFE particles. The resulting putty-like mass is then repeatedly and biaxially calendered, with a progressive narrowing of the gap between the rollers (while at least maintaining the water content), until shear causes the PTFE to fibrillate and enmesh the particulate and a layer of desired thickness is obtained. Removal of any residual surfactant or wetting agent by organic solvent extraction or by washing with water after formation of the sheet article is generally desirable. The resultant sheet is then dried. Such sheets preferably have a thickness in the range of 0.1 ml to 0.5 mm. Sheet articles with a thickness in the general range of 0.05 mm to 10 mm can be useful.

The void size and volume within such a membrane can be controlled by is regulating the lubricant level during fabrication a described in U.S. Pat. No. 5,071,610. Because both the size and the volume of the voids can vary directly with the amount of lubricant present during the fibrillation process, webs capable of entrapping particles of various sizes are possible. For instance, increasing the amount of lubricant to the point where it exceeds the lubricant sorptive capacity of the particulate by at least 3% (by weight) and up to 200% (by weight) can provide mean pore sizes in the range of 0.3 $\mu$m to 5.0 $\mu$m with at least 90% of the pores having a size of less than 3.6 $\mu$m. This process can be used to create a web with particulate enmeshed therein. The PTFE which forms the web within which particulate is to be trapped can be obtained in resin emulsion form wherein the PTFE and lubricant are already pre-mixed (e.g., Teflon™ 30 or 30B, DuPont de Nemours; Wilmington, Del.). To this emulsion can be added additional lubricant in the form of water, water-based solvents such as a water-alcohol solution, or easily-removable organic solvent such as ketones, esters, and ethers, to obtain the aforementioned desired proportion of lubricant and particulate.

B. Non-PTFE Sheet Material (Webs)

In other embodiment of the present invention, the sheet material can comprise non-woven, polymeric macro- or microfibers preferably selected from the group of polymer consisting of polyamime, polyolefin, polyester, polyurethane, polyvinylhalide, or glass, ceramic, or quartz fibers, or a common thereof. If polyvinylhalide is used, it preferably comprises fluorine of at most 75% (by weight) and more preferably of at most 65% (by weight). Addition of a surfactant to such webs may be desirable to increase the wettability of the component fibers.

1. Macrofibers

The web can comprise thermoplastic, melt large-diameter fibers which have been mechanically-calendered, air-laid, or spun-bonded. These fibers have average diameters in the general range of 50 $\mu$m to 1000 $\mu$m.

Such non-woven webs with large-diameter fibers can be prepared by a spunbond process which is well known in the art. (See, e.g., U.S. Pat. Nos. 3,338,992, 3,509,009, and 3,528,129, the fiber preparation processes of which are incorporated herein by reference.) As described in these references, a post-fiber spinning web-consolidation step (i.e., calendering) can be required to produce a self-supporting web. Spunbonded webs are commercially available from, for example, AMOCO, Inc. (Naperville, Ill.).

Non-woven webs made from large-diameter staple fibers can also be formed on carding or air-laid machines (such as a Rando-Webber™, Model 12BS made by Curlator Corp., East Rochester, N.Y.), as is well known in the art. See, e.g., U.S. Pat. Nos. 4,437,271, 4,893,439, 5,030,496, and 5,082,720, the processes of which are incorporated herein by reference.

A binder is normally used to produce self-supporting webs prepared by the air-laying and carding processes and is optional where the spunbond process is used. Such binders can take the form of resin systems which are applied after web formation or of binder fibers which are incorporated into the web during the air laying process. Examples of such resin systems include phenolic resins and polyurethanes. Examples of common binder fibers include adhesive-only type fibers such as Kodel™ 43UTD (Eastman Chemical Product; Kingsport, Tenn.) and bicomponent fibers, which are available in either side-by-side form (e.g., Chisso ES Fibers, Chisso Corp., Osaka, Japan) or sheath-core for (e.g., Melty™ Fiber Type 4080, Unitika Ltd., Osaka, Japan). Application of heat and/or radiation to the web "cures" either type of binder system and consolidates the web.

Generally speaking, nonwoven webs comprising macrofibers have relatively large voids. Therefore, such webs have low capture efficiency of small-diameter particulate which is introduced into the web. Nevertheless, particulate can be incorporated into the non-woven webs by at least four means. First, where relatively large particulate is to be used, it can be added directly to the web, which is then calendered to actually enmesh the particulate in the web (much like the PTFE webs described previously). Second, particulate can be incorporated into the primary binder system (discussed above) which is applied to the non-woven web. Curing of this binder adhesively attaches the particulate to the web. Third, a secondary binder system can be introduced into the web. Once the particulate is added to the web, the secondary binder is cured (independent of the primary system) to adhesively incorporate the particulate into the web. Fourth, where a binder fiber has been introduced into the web during the air laying or carding process, such a fiber can be heated above its softening temperature. This adhesively captures particulate which is introduced into the web. Of these methods involving non-PTFE macrofibers, those using a binder system are generally the most effective in capturing particulate. Adhesive levels which will promote point contact adhesion are preferred.

Once the particulate has been added, the loaded webs are typically further consolidated by, for example, a calendering process. This further enmeshes the particulate within the web structure.

Webs comprising larger diameter fibers (i.e., fiber with average diameter between 50 $\mu$m and 1000 $\mu$m) have relatively high flow rates because they have a relatively large mean void size.

2. Microfibers

When the sheet material comprises non-woven microfibers, those microfibers provide thermoplastic, melt-down polymeric materials having sorptive or active particulate dispersed therein. Preferred polymeric materials include polyolefins such as polypropylene and polyethylene, preferably further comprising a surfactant, as described in, for example, U.S. Pat. No. 4,933,229, the process of which is incorporated herein by reference. Alternatively, surfactant can be applied to a blown microfibrous (BMF) web subsequent to web formation. Particulate can be incorporated into BMF webs described in U.S. Pat. No. 3,971,373, the process of which incorporated herein by reference.

Microfibrous webs of the present invention have average fiber diameters up to 50 $\mu$m, preferably from 2 $\mu$m to 25 $\mu$m, and most preferably from 3 $\mu$m to 10 $\mu$m. Because the void sizes in such webs range from 0.1 $\mu$m to 10 $\mu$m, preferably from 0.5 $\mu$m to 5 $\mu$m, flow through these webs is not as great as is flow through the macrofibrous webs described above.

3. Cast Porous Membranes

Solution porous membranes can be provided by methods known in the art. Such porous membranes can be, for example, polyolefin (including polypropylene), polyamide, polyester, polyvinyl chloride, and polyvinyl acetate fibers, or any combination of the foregoing.

4. Fibrous Pulps

The present invention also provides a solid phase extraction sheet comprising a fibrous pulp, preferably a polymeric pulp, comprising a plurality of fibers that mechanically entrap active particles, and preferably a polymeric hydrocarbon binder. Preferably, the weight ratio of particles to binder is at least 13:1 and the ratio of average uncalendered sheet thickness to effective average particle diameter is at least 125:1.

Generally, the fibers that make up the porous polymeric pulp of the solid phase extraction sheet of the present invention can be any pulpable fiber (i.e., any fiber that can be made into a porous pulp). Preferred fibers are those that are stable to radiation and/or to a variety of pHs, especially very high pHs (e.g., pH=14) and very low pHs (e.g., pH=1). Examples of these fibers include aromatic and non-aromatic polyamide fibers and those polyolefin fibers that can be formed into a pulp which include, but are not limited to, polyethylene and polypropylene. Particularly preferred fibers are aromatic polyamide fibers and aramid fibers because of their stability to both radiation and highly caustic fluids. Examples of useful non-aromatic polyamide fibers are those fibers of the nylon family. Polyacrylonitrile, cellulose, and glass can also be used, along with combination of pulps.

Examples of useful range fibers are those fibers sold under the trade name Kevlar™ (DuPont, Wilmington, Del.). Kevlar™ fiber pulps are commercially available in three grades based on the length of the fibers that make up the pulp. Regardless of the type of fiber or combination of fibers chosen to make up the pulp, the relative amount of fiber in the resulting solid phase extraction sheet when dry ranges from about 12.5 percent to about 30 percent fibers by weight, and preferably is in the range from about 15 percent to 25 percent fibers by weight.

Useful binders in the sheet material of the present invention are those materials that are stable over a wide range of pHs, including high pHs, and that exhibit little or no interaction (i.e., chemical reaction) with either the fibers of the pulp or the particle entrapped therein. Polymeric hydrocarbon materials originally in the form of latexes, have been found to be especially useful. Common examples of useful binders include, but are not limited to, natural rubbers, neoprene, styrene-butadiene copolymer, acrylate resin, and polyvinyl acetate. Preferred binders include neoprene and styrene-butadiene copolymer. Regardless of the type of binder used, the relative amount of binder in the resulting solid phase extraction sheet when dried is about 3 percent to about 7 percent by weight, and is preferably about 5 percent by weight. Sheets having about percent binder have been found to have nearly the same physical integrity as sheets that include about 7 percent binder, while allowing for as great a particle loading as possible. It may be desirable to add a surfactant to the fibrous pulp, preferably in small amounts up to about 0.25 weight percent of the composite.

Because the capacity and efficiency of the sheet material depends on the amount of particles included therein, high particle loading is desirable. The relative amount of particles in a given sheet material of the present invention is preferably at least about 65 percent by weight, more preferably at least about 70 percent by weight, and most preferably at least about 75 percent by weight. Additionally, the weight percentage of particles in the resulting sheet material is at least 13 times greater than the weight percentage of binder, preferably at least 14 times greater than the weight percentage of binder, and more preferably at least 15 times greater than the weight percentage of binder.

Regardless of the type or amount of the particles used in the sheet material of the preset invention, the particles are mechanically entrapped or entangled in the fibers of the porous pulp. In other words, the particles are not typically covalently bonded to the fibers.

Particulate material (which can be one material or a combination of materials) useful in the present invention is substantially insoluble in water or the elution solvent. Not more than 1.0 gram of particulate will dissolve in 100 gram of aqueous media or elution solvent into which particulate is mixed at 20° C. The particulate material can be at least one of an organic compound, a polymer such a poly(styrene-co-divinyl-benzene), or an inorganic oxide such a silica, alumina, titania, zirconia, and other ceramics, and combinations thereof, or it can be ion exchange or chelating particles or mixtures thereof or it can be carbon. Preferred particulate materials include polymers, silica, and zirconia, with silica being particularly preferred because of the ease in bonding a variety of hydrophobic and other functional coatings onto its surface and because of commercial availability. Particulates such as silica and other inorganic oxides are commercially available, for example, from Aldrich Chemical Co., Milwaukee, Wis. Zirconia is available from Z-Tech Corporation, Bow, N.H.

Suitable particulate material, also referred to particles for purposes of this invention, includes any particle with inherent sorptive properties or those which can be coated with substantially insoluble sorptive material or the surface, external and/or internal, of which can be derivatized to provide a coating of substantially insoluble, sorptive material. Preferred supports for such coatings include inorganic oxide particles, most preferably silica particles.

The insoluble, sorptive coating generally have a thickness in the range of one molecular monolayer to about 1 micrometer. Such particles having coated surfaces are well known in the art, see, for example, Snyder and Kirkland, "Introduction to Modern Liquid Chromatography", 2d Ed., John Wiley & Sons, Inc. (1979) and H. Figge et al., "Journal of Chromatography" 351 (1986) 393–408. The coatings can be mechanically applied by in-situ crosslinking of polymers or the coatings can be functional groups covalently bonded to the surface of the organic or inorganic particles. Coatings which can be applied to silica particulate can be non-swellable polymers such as crosslinked silicones, polybutadienes, etc., or covalently bonded organic groups such as aliphatic groups of varying chain length (e.g., $C_2H_5$, $C_4H_9$, $C_8H_{17}$, and $C_{18}H_{37}$) and aliphatic and aromatic groups containing amine, nitrile, hydroxyl, chiral, and other functionalities which alter the sorptive character of the coating. Many such coated particles are commercially available (e.g., $C_{18}$ bonded phase silica, Alltech, Dearfield, Ill.).

When coated particulate are used, silica, or other support particle, can act primarily as a carrier or substrate for organic coating ad coated particles are generally non-swellable even when thin layers of swellable coatings are used. Composition of the coatings provides variations in chemical selectivity and polarity influencing separations and performance, as recognized by those skilled in the art.

The particulate material may have a regular shape (such as spherical or cubic) or an irregular shape. Particulate material which has been found useful in the invention has an apparent size within the range of 0.1 to about 200 micrometers, preferably in the range of 1.0 to 100.0 micrometers, more preferably in the range of 5.0 to 40 micrometers.

In another aspect, the present invention provides reactive supports which can be particulate, coated particulate, coated fibers, or any other porous, high surface area article capable of reacting with or catalyzing the reaction of at least one chemical species with which it comes in contact. Such species can be ions, molecules, molecular aggregates, polymers, or any other species dissolved in or ionically dispersed in a fluid medium.

If desired, multiple layers of particle-loaded sheet material can be used, with each layer of sheet material preferably being separated from other particle-loaded layers of sheet material by at least one protective layer. The multiple layer of particle-loaded sheet material can contain active particulate that is selective for different types of species. In this way, a plurality of dissimilar species can be removed by one solid phase extraction article.

Figure 3:
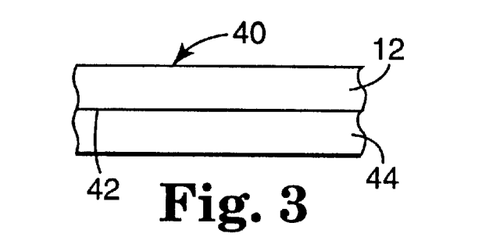
FIG. 3 is a cross sectional view of a multi-layered configuration of a porous, particle loaded, fibrous sheet material with a support layer.

A shown in FIG. 3, sheet material 12 may be attached to a support layer 44 to provide structural support for the sheet material, where support layer 44 can include materials such paper, metal (e.g., stainless steel), non-woven polymeric webs, or polymeric screens or scrims (e.g., fine mesh polypropylene screen material). The material selected for the support layer is preferably rigid enough to support sheet material 12 while being flexible enough to allow the sheet material to be easily wound into a spiral or formed into some other configuration. In addition, support layer 44 should be chosen so as to be chemically inert toward the fluid or fluids passing by it. Sheet material 12 may be adhered to support layer 44 by known adherence methods such a by applying a pressure sensitive adhesive between sheet material 12 and support layer 44 and present the layers together to form multi-layered sheet material. Alternatively, support layer 44 may be at least partially embedded in sheet material 12, as is described in pending U.S. patent application Ser. No. 08/500,230, entitled "Reinforced Particle-Loaded Fibrillated PTFE Web" (Balsimo et al.), which is commonly owned by the assignee of the present invention and the contents of which are incorporated herein by reference.

Figure 4:
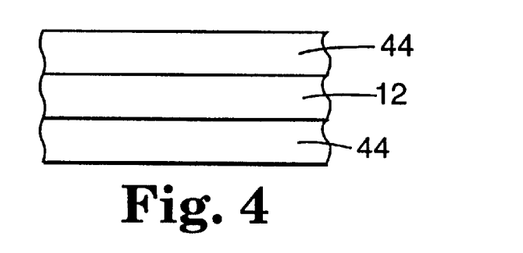
FIG. 4 is a cross sectional view of a multi-layered configuration of a porous, particle loaded, fibrous sheet material with multiple support layers.

FIG. 4 illustrates another configuration of sheet material 12 and support layers 44, wherein a layer of sheet material 12 is portion between two support layers 44. Additional layers of sheet material 12 and support layers 44 may be added to this configuration as desired, where layers of sheet material 12 and support layers 44 are preferably alternated with each other throughout the thickness of the material. Alternatively, support layer 44 may be positioned between two layers of sheet material 12 (not shown). Additional layers of sheet material 12 and support layers 44 may also be added to this configuration as desired. Many other multiple layer configurations may be used, such as using multiple layers of sheet material 12 that are adjacent to each other with single or multiple adjacent support layers 44. When a multiple layer configuration is used, the layers are preferably selected so that the multiple layers are rigid enough to support sheet material 12 while being flexible enough to allow the sheet material to be easily wound into a spiral or formed into some other configuration.

Figure 5:
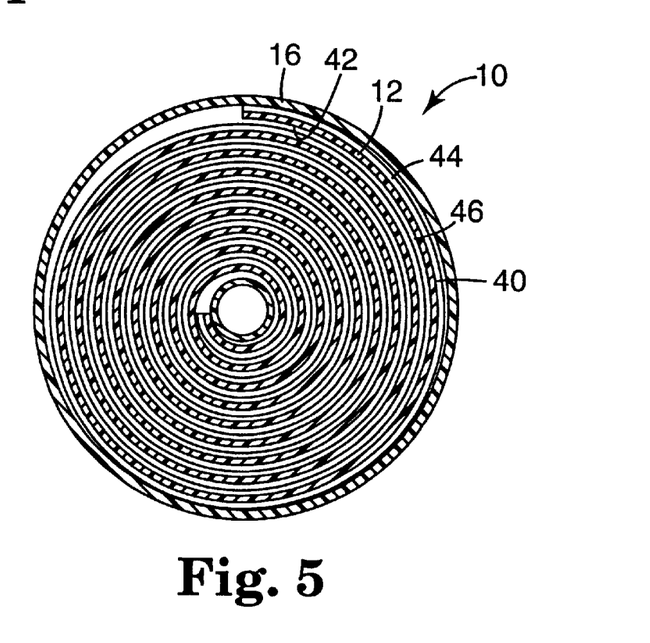
FIG. 5 is a cross sectional view of one embodiment of a solid phase extraction article of the present invention.

Another alterative embodiment of sheet material layers in solid phase extraction article 10 is illustrated in FIG. 5, which shows a layer of sheet material 12 attached to support layer 44 as described above. However, in this embodiment, when the layers are wound into spiral, a spacer material 46 is provided between at least some of the windings thereby the layers from each other. The spacer material may comprise separate pieces such as rods or tubes that are inserted in the axial direction of extraction article 10 between the spiral windings. The spacer material may alternatively be a strip of material placed along either first working surface 40 or second working surface 42 and wound with sheet material 12 into the spiral configuration, or some other spacer configuration may be used. The spacer material 46 may be, for example, polymeric, cellulosic, or other material maintains its shape and is inert to the fluid or passing by it. It is contemplated that any of the above described multiple layer configurations may also be used in this embodiment where spacer material 46 is provided between at least some of the multi-layer windings.

Referring again to FIG. 1, the illustrated embodiment includes a rod having an axis A, about which the sheet material is spirally wound. However, it is also contemplated that the solid phase extraction article 10 does not include a rod 14. Instead, the sheet material may be wound about itself in a spiral configuration within the housing 16 of the solid phase extraction article 10.

Figure 6:
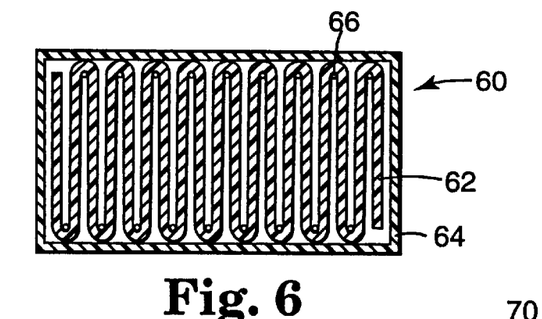
FIG. 6 is a cross sectional view of another embodiment of a solid phase extraction article.

An alternative configuration of sheet material in a solid phase extraction article 60 is illustrated in cross section in FIG. 6. In this embodiment, an elongated, porous, particle loaded, fibrous sheet material 62 is pleated within a rectangular housing 64. As shown, sheet material 62 may be pleated about rods 66 or some other devices that provide a surface is more rigid than the sheet material for keeping the sheet material properly positioned within housing 64. However, sheet material 62 may instead be pleated within housing 64 without the use of rods 66. In the preferred embodiment, pleated sheet material 62 should substantially fill the housing 64 so that the sheet material is packed tightly enough that essentially a fluid flowing through the device comes into intimate contact with at least a portion of the sheet material, yet the sheet material is packed loosely enough that fluid flow through the device is not significantly impaired. Adjustment of the packing density of the sheet material may be necessary, based upon the particular fluid to be treated and the amount of or nature of suspended matter therein. Further, housing 64 need not necessarily be rectangular, but may have some other shape in cross section, such as oval, pentagonal, triangular, or the like. When one of these alternate shapes for the housing 64 is used, pleated sheet material 62 should again substantially fill the housing 64.

Figure 7:
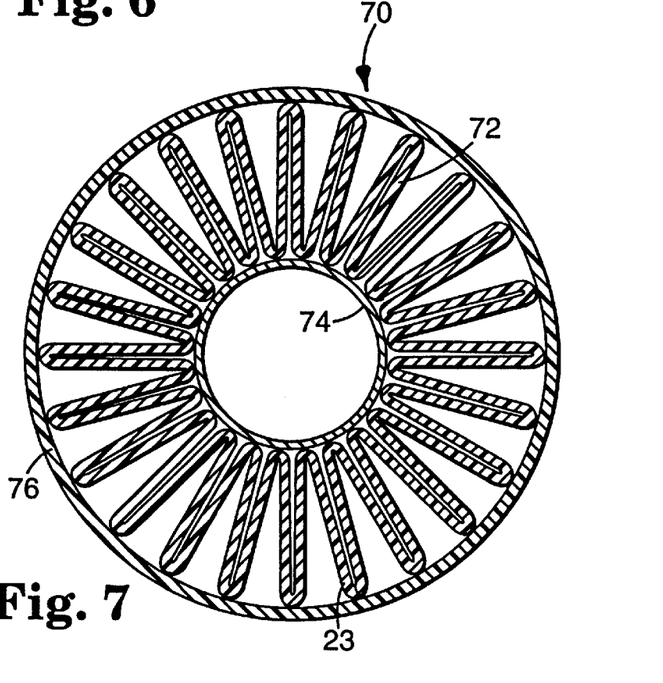
FIG. 7 is a cross sectional view of an alternate embodiment of a solid phase extraction article.

Alternatively, a sheet material 72 may be pleated and joined to itself in a solid phase extraction article 70 so as to form a cylinder that preferably encircles a core 74, a is illustrated in FIG. 7 and as is described in pending U.S. patent application Ser. No. 08/590,978, entitled "Cartridge Absorption Device" (White et al.), which is commonly owned by the assignee of the present invention and the contents of which are incorporated herein by reference. In this embodiment, the pleated sheet material is surrounded by a housing 76, which may be cylindrical, as shown, or may be some other shape in cross section.

Figure 8:
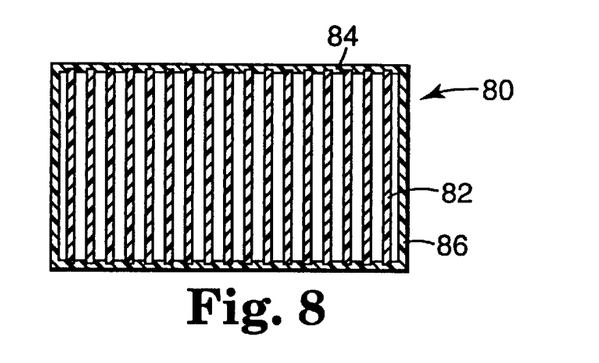
FIG. 8 is a cross sectional view of another embodiment of a solid phase extraction article.

Another alternative embodiment of a solid phase extraction article 80 is illustrated in cross section in FIG. 8. In this embodiment, individual sheets of material 82 are secured by a securing or damping device 84 within a housing 86. Housing 86 may be any desirable shape, such as circular, rectangular, triangular, or the like. The securing or damping device 84 can be any suitable device for holding individual sheets of material 82 in position across the width of housing 86. As with other described embodiment, it is preferable that sheets of material 82 substantially fill the interior of the housing 86.

The extraction of dissolved species from a solution in accordance with the present invention will now be described with reference to FIGS. 1 and 1A. In one preferred method, the fluid is supplied to solid phase extraction article 10 in a direction D so that the flow of the fluid is generally parallel to the surface of the particle loaded, fibrous sheet material 12, or at an angle of 0 degrees with respect to the edge of the sheet. More particularly, fluid is supplied to inlet 34 and flows into the first axial hole 22 of rod 14. This fluid then flows through rod 14 to at through outlet holes 26 and into first end cap 30. The fluid then enters the first end 18 of housing 16, coming in contact with edges of the spirally wound sheet material 12. As shown, since the spirally wound sheet material 12 substantially fills housing 16, the fluid flowing through 16 from the first end 18 toward the second end 20 must pass along at least one surface of the particle loaded, fibrous sheet material 12. It is preferable that a pump (not shown) be used to control the quantity and rate of fluid moving through the housing 16. The fluid then moves through housing 16 to the second end 20, where it exits housing 16 and flows into the second end cap 32 and into the plurality of inlet holes 28 in the rod 14. The fluid then exits from the article 10 through the outlet 36.

The above described method of extracting dissolved species from a solution may also be used with any of the described alternative embodiment or equivalents thereof.

With any embodiment, the fluid to be treated is introduced axially to the major plane of the solid phase extraction sheet so that the fluid flows along at least one face of the sheet material. In other words, the fluid is introduced at the edges of the sheet material rather than at the major plane or face of the sheet so that the fluid flow is along the face of the material rather than perpendicular to the sheet material.

Although one specific means of supplying fluid to the end of the solid phase extraction article 10 has been described, a number of alternative means are contemplated, and are encompassed within the description presented herein. For example, a nipple (not shown) having a number of orifices could be attached to the distal or inner end of inlet 34 so as to provide an even spray of supplied fluid to housing 16 within first end cap 30. Alternatively, fluid exiting inlet 34 could be directed against a dispersing element, such as a flat plate or disk interposed between the inner end of inlet 34 and the edges of the spirally wound sheet material 12 such that the supply fluid is distributed evenly across the edges of the sheet material. Other alternative means for evenly distributing fluid within first end cap 30 are considered to be equivalent to the embodiment described herein.

As fluid passes along the sheet material 12 as described, active particulate entrapped therein preferentially binds the species to be removed. Dissolved species are driven into the sheet material by diffusion. However, suspended solid particles are allowed to pass through housing 16 without plugging the pores in sheet material 12, since there is essentially no fluid flow through the sheet material. Typically, fluid enters article 10 trough inlet 34 and exits through outlet 36, although the opposite flow arrangement is also contemplated.

When the sheet material 12 of a particular solid phase extraction article 10 has bound as much contaminant as possible, the article 10 may be removed and replaced with a new article 10. If desired, the absorbed 5 can be unbound from the binding particulate by eluting it with a stripping solution, thereby making the article 10 useful to again remove species from a fluid. The binding-stripping-regeneration process can be continued for multiple cycles, thereby allowing the article 10 to be used numerous times for removing species. Preferably, the user will have more than one available article 10, so that when the bound species are being eluted from a fully loaded article 10, another article 10 can be removing species from a fluid within the same process.

The operation of the present invention will be further described with regard to the following detailed examples. These examples are offered to further illustrate the various species and preferred embodiments and techniques. It should be understood, however, that many variations and modifications may be made while remaining within the scope of the present invention.

THE EXAMPLES

Example 1

A solid phase extraction article was constructed as follows: 6 mm diameter holes 2 cm deep were drilled axially in the center of each end of a 1.59 cm diameter×9.52 cm long steel rod. Two additional holes, 3 diameter, were drilled in each end of the rod, 2 cm from the end, orthogonal to each other and intersecting each of the axial holes. The steel rod prepared in this manner allowed liquid to enter the ends of the rod and flow out of the sides of the rod through four holes.

A solid phase extraction membrane or sheet material was prepared as follows: Commercially-available EMPORE™ solid phase section sheet containing $C_{18}$-modified silica particles (J. T. Baker Co., Phillipsburg, N.J.) was dry calendered successively at 0.38 mm a 0.20 mm to reduce the original thickness from 0.50 mm to 0.25 mm. A portion of the calendered membrane measuring 9.52 cm×28.6 cm×0.25 mm was cut to be used in a cartridge. A portion of a fine mesh polypropylene membrane (Naltex™ Zicot™ symmetrical scrim, 25 strands/2.54 cm, Nalle Plastics, Inc., Austin, Tex.) measuring 9.52 cm×28.6 cm×0.77 mm was attached to the central portion of the drilled steel rod using double-sided acrylic transfer tape (Scotch™ VHB tape, 3M Co., St. Paul, Minn.). The mesh was wound once around the rod, then the calendered membrane was inserted into the mesh winding, and the membrane-plus-mesh construction was wound around the steel rod such that the four sets of orthogonal holes remained exposed on either end of the wound membrane, and the spiral construction was approximately 2.34 cm in diameter. The void space at the end of the construction was filled with an RTV silicone adhesive such as is commercially available from Dow Corning Corp., Midland, Mich., as Dow Corning Silastic™ 732 RTV Sealant. The spiral-wound construction was introduced into a 2.54 cm ID poly(vinylchloride) (PVC) tube and the tube ends were closed and sealed by caps having a centrally-fitted nipple having an interior end that abutted the central axial hole in the steel central core and an exterior end capable of connection to a laboratory pump via flexible tubing.

Five cartridges were prepared in this manner, as shown in Table 1. All cartridges were prepared wing 2.54 cm ID PVC tubes.

TABLE 1

| Sample | Membrane | | | Scrim | | Membrane area, cm² | Membrane vol, cm³ |
| | length cm | width cm | thickness mm | Type | thickness mm | | |
| --- | --- | --- | --- | --- | --- | --- | --- |
| 1A | 28.6 | 9.52 | 0.25 | PP[1] | 0.77 | 272.3 | 6.8 |
| 1B | 18.4 | 9.52 | 0.51 | PP[1] | 0.77 | 175.3 | 8.94 |
| 1C | 15.2 | 9.52 | 0.25 | PP[2] | 0.77 | 145.1 | 3.63 |
| 1D | 14.6 | 9.52 | 0.51 | PP[2] | 0.77 | 139.0 | 7.09 |
| 1E | 30.5 | 9.52 | 0.25 | PP[3] | 0.77 | 290.2 | 7.25 |

[1]Naltex ™ Zicot ™ symmetrical polypropylene scrim, 25 strands/2.54 cm
[2]Expandable polypropylene scrim similar to Naltex ™ S-627MD ™, having 12 strands/2.54 cm in the manufactured direction and 30 strands/2.54 cm at a 45 degree angle thereto
[3]Naltex ™ Zicot ™ symmetrical polypropylene scrim, 40–45 strands/2.54 cm

Example 2

Cartridges prepared in Example 1 were challenged with a blue dye solution to test their effectiveness as solid phase extraction devices. An aqueous methnol dye solution, Azure Blue Dye (Pfalz and Bauer, Waterbury, Conn.), 0.1 g/L, was prepared and pumped into each column using a peristaltic pump (Masterflex Model 7518-00, Cole-Parmer Instrument Co., Venon Hills, Ill.) connected to the cartridge by #14 Masterflex tubing at the flow rate indicated. In each case, 150 ml methanol was pumped through the cartridge prior to introduction of the dye solution, to condition the membrane. Effluent from the cartridges was analyzed in a UV/VIS Spectrophotometer (Model 8452A Diode Array Spectrophotometer, Hewlett-Packard Instrument Co., Wilmington, Del.) at 412 nm to determine dye concentration. Results are shown in Table 2.

TABLE 2

| Sample | Flow rate ml/min | Time min | Absorbance |
|---|---|---|---|
| 1A* | — | — | 0.0021 |
| 1A | 10 | 1 | 0.0347 |
| " | 10 | 2 | 0.8467 |
| " | 10 | 5 | 0.9173 |
| " | 10 | 10 | 0.9333 |
| " | 5 | 15 | 0.6260 |
| " | 2 | 20 | 0.5303 |
| " | 2 | 25 | 0.4818 |
| " | 2 | 45 | 0.5307 |
| " | 2 | 85 | 0.5503 |
| " | 2 | 90 | 0.3857 |
| 1B** | — | — | 1.7243 |
| 1B | 10 | 2 | 0.9894 |
| " | 10 | 5 | 1.2274 |
| " | 10 | 10 | 1.1815 |
| " | 5 | 15 | 0.9783 |
| " | 2 | 25 | 0.8587 |
| 1C** | — | — | 1.7039 |
| 1C | 10 | 2 | 0.1256 |
| " | 10 | 5 | 1.0269 |
| " | 10 | 10 | 1.0832 |
| " | 5 | 20 | 0.8217 |
| " | 2 | 40 | 0.5434 |
| " | 2 | 125 | 0.5279 |
| 1D | 10 | 2 | 1.0769 |
| " | 10 | 5 | 1.3031 |
| " | 10 | 10 | 1.3217 |
| " | 5 | 15 | 1.1778 |
| " | 2 | 20 | 1.0919 |
| " | 2 | 60 | 1.0638 |
| 1E** | — | — | 1.7215 |
| 1E*** | 10 | 2 | 0.4991 |
| " | 10 | 5 | 0.6464 |
| " | 10 | 10 | 0.6737 |
| " | 5 | 15 | 0.4558 |
| " | 2 | 20 | 0.3644 |
| " | 2 | 35 | 0.2293 |
| " | 2 | 65 | 0.2534 |
| " | 2 | 90 | 0.4510 |

*Blank determination for deionized water
**Dye feed solution
***Preconditioned with 1000 ml MeOH On completion of trial 1D, the cartridge was disassembled. Significant channeling of the dye solution through the spirally-wound membrane construction was observed, which accounts for the relatively low dye absorption by the spiral wound cartridges. As a result of this observation, assembly of cartridge 1E was modified to include a scrim (Naltex™ Zicot™ symmetrical polypropylene scrim, 40–45 strands/2.54 cm, Nalle Plastics, Inc., Austin, Tex.) having a much finer mesh than either of the previous scrims. Also, additional RTV silicone sealant was applied at the outside end of the scrim and membrane in an attempt to prevent channeling of the dye solution. The combination of finer scrim and better sealing gave a cartridge with improved dye retention.

Cartridge effectiveness in removing dye at 2 ml/min is shown in Table 3, calculated as the percent decrease in dye concentration, according to the formula:

$$\frac{A_{dye\ feed} - A_{effluent\ @\ 2ml/min}}{A_{dye\ feed}} \times 100 = \%\ \text{effectiveness}$$

TABLE 3

| Sample | % Effectiveness |
|---|---|
| 1A | 71 |
| 1B | 50 |
| 1C | 69 |
| 1D | 38 |
| 1E | 87 |

The data of Tables 2 and 3 show that dye could be removed from an aqueous methanol solution by the "flow-by" method, and that cartridge 1E was the most effective at removing dye.

Example 3

Two cartridges were prepared as described in Example 1: Cartridge 3A measured 2.54 cm ID×9.52 cm long; cartridge 3B measured 2.54 cm ID×19.69 cm long. A solid phase extraction membrane, 1.125 mm thick, was prepared as described in U.S. Pat. No. 5,279,742, Example 1, using 8 micrometer average diameter styrene-divinylbenzene particles (Sarasep, Inc., Santa Clara, Calif.), such that the particles constituted 90% of the total weight of the web. The membrane was further calendered until it was 0.275 mm thick, then laminated a 0.50 mm thick polypropylene screen (Naltex Zicot, 40–45 strands/2.54 cm, Nalle Plastics, Inc., Austin, Tex.) by calendering the composite at a gap of 0.50 mm.

A section of membrane measuring 33.02 cm×9.52 cm was wound and assembled into cartridge 3A as previously described, and a section measuring 35.6 cm×19.69 cm was wound and assembled into cartridge 3B. Ultrafiltration-clarified grapefruit juice was pumped through the cartridges using a peristaltic pump at 5 ml/min, as shown in Table 4 in order to remove the bitter component limonene. Limonene concentration in the effluent was measured by liquid chromatography methods.

TABLE 4

| Time | Limonene, ppm | |
|---|---|---|
| min | Cartridge 3A | Cartridge 3B |
| 0 (Feed Concentration) | 23.56 | 27.43 |
| 4 | 9.99 | 13.75 |
| 14 | 15.32 | 17.72 |
| 29 | 16.32 | 16.13 |
| 44 | 12.57 | 17.25 |
| 59 | 10.24 | 17.75 |
| 74 | 12.88 | — |
| 89 | 11.95 | 18.04 |
| 104 | 14.10 | — |
| 119 | 13.53 | — |

TABLE 4-continued

| Time | Limonene, ppm | |
|---|---|---|
| min | Cartridge 3A | Cartridge 3B |
| 134 | 14.31 | — |
| 149 | 13.32 | 19.38 |
| 179 | — | 19.75 |
| 209 | — | 21.29 |
| 239 | — | 19.84 |
| 289 | — | 21.37 |
| 319 | — | 20.96 |

In Table 4, no entry means that a measurement was not taken at that time. Table 4 shows that limonene can be partially removed from a flow of citrus (grapefruit) juice over an extended time period by a solid phase extraction membrane spiral-wound in a cartridge. Cartridge 3A received a total of 745 ml juice; cartridge 3B received 1595 ml juice. No significant breakthrough was observed in these two columns, and flow rate was maintained throughout the time period with no significant fouling of the membrane.

Example 4

Three solid phase extraction cartridges were prepared as previously described, using 3.81 cm ID×19.69 cm long PVC pipe as housing for the membranes. Membranes comprising 90% by weight styrene divinylbenzene particles and measuring 19.69 cm×121.9 cm were prepared and spirally wound around a 2.22 cm diameter steel rod that had been drilled as described in Example 1. Ultrafiltration-clarified grapefruit juice was pumped through the cartridges at selected flow rates, as shown in Table 5. Limonene concentration was measured by liquid chromatographic materials.

TABLE 5

| Time | Limonene concentration ppm | | | |
|---|---|---|---|---|
| min | Cart. 4A[1] | Cart. 4B[1] | Cart. 4C[2] | Cart. 4D[3] |
| 0 (Feed Conc.) | 25.11 | 29.56 | 29.35 | 27.29 |
| 5 | 0 | 0 | 3.09 | 4.99 |
| 15 | 0 | — | — | — |
| 30 | 0 | — | 4.81 | 5.51 |
| 60 | 0 | 0 | 4.25 | 5.98 |
| 90 | 0 | — | — | — |
| 120 | 0 | 1.45 | 8.15 | 9.42 |
| 150 | 0.97 | — | — | — |
| 180 | 1.08 | 3.3 | 10.15 | 13.18 |
| 210 | 1.08 | — | — | — |
| 240 | 1.71 | 3.84 | 12.93 | 18.04 |
| 270 | 2.14 | — | — | — |
| 300 | 2.53 | 4.28 | 15.91 | 19.75 |
| 330 | 2.5 | — | — | — |
| 360 | 2.80 | 5.43 | 16.78 | 22.65 |
| 390 | 3.27 | — | — | — |
| 420 | 3.70 | 4.44 | 17.58 | 23.96 |
| 480 | — | 5.94 | — | — |
| 510 | — | 4.33 | — | — |

[1]Flow rate = 15 ml/min
[2]Flow rate = 50 ml/min
[3]Flow rate = 75 ml/min

Table 5 shows that, at a flow rate of 15 ml/min, the cartridges of the invention removed approximately 85% of limonene from grapefruit juice, without fouling or plugging over an 8.5 hour period (cartridges 4A and 4B). At the flow rates, breakthrough occurred such that, after about 4.5 hours, cartridge 4C was removing less than half of the limonene (50 ml/min), and, after about 3.5 hours, cartridge 4D was removing less than half of the limonene (75 ml/min).

Example 5

In order to test the ability of spiral-wound solid phase extraction articles of the present invention to withstand extreme fouling conditions, a cartridge was constructed and tested as follows. A tubular PVC cartridge body measuring 2.54 cm ID×9.52 cm long was filled with a solid phase extraction membrane that had been laminated to a fine-mesh screen. The membrane comprised approximately 90% by weight of $C_{18}$-modified silica, as described in Example 1, and was reduced in caliper from the 0.50 mm thickness as obtained down to 0.25 mm thick, by successive calendering at 0.375 mm, 0.25 mm, 0.175 mm and 0.125 mm, then laminated to a 0.50 mm thick fine mesh (diagonal pattern) polymeric scrim by calendering the composite at a gap of 0.50 mm, to give a laminated composite having a thickness of 0.61 mm. A portion of the membrane measuring 9.52 cm×34.3 cm was secured to and wound around a drilled steel shaft, then inserted in the cartridge housing and sealed as previously described.

A slurry of 60 mg standard fine dust test particles (AC Fine Air Cleaner Test Dust, AC Spark Plug Div., General Motors Corp., Flint, Mich.) in 200 ml of standard azure blue dye solution (Example 1) was prepared. Particle size distribution of AC Fines was 38% less than 5.5 microns, 54% less than 11 microns, 71% less than 22 microns, and 89% less than 44 microns. The slurry was pumped through the cartridge at 5 ml/min, with no apparent decrease in flow rate or fouling. A second slurry of 600 mg AC Fines in 200 ml dye solution was prepared and pumped through the cartridge. After passing 180 ml of the second particle loaded slurry, flow rate slowed to 4.3 ml/min, indicating some fouling of the cartridge.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalent of those structures.

I claim:

1. A method of removing dissolved species from a fluid while allowing suspended solid particles to remain within in the fluid, the fluid including dissolved species and suspended solid particles, comprising the steps of:

providing a solid phase extraction article comprising a first end, a second end opposite the first end, an axis extending from the first end to the second end, and a porous, particle loaded, fibrous sheet material formed into a spiral configuration about the axis, wherein the sheet material is wound around itself to provide multiple layers of sheet material, wherein each layer of sheet material is spaced from each adjacent layer of sheet material, and wherein the sheet material comprises a first working surface, a second working surface opposite the first working surface, and an inner portion comprising active particles between the first and second working surfaces;

passing a fluid including dissolved species and suspended solid particles through the solid phase extraction article from the first end to the second end in an axial direction, wherein the suspended solid particles do not substantially obstruct the first or second working surfaces so that the fluid including dissolved species can reach the inner portion of the sheet material and wherein fluid contacts both the first and second working surfaces of the sheet material and active particles contained within the sheet material remove the dissolved species from the fluid as the fluid passes through the solid phase extraction article.

2. The method of claim 1, wherein the provision of a solid phase extraction article further comprises inserting the sheet material into a housing.

3. The method of claim 2, wherein the housing has a generally tubular shape.

4. The method of claim 1, wherein the provision of a solid phase extraction article further comprises providing at least one spacer positioned between adjacent layers of sheet material to space the adjacent layers of sheet material from each other.

5. The method of claim 1, wherein the step of providing a solid phase extraction article further comprises attaching a support layer of material to the particle loaded, fibrous sheet material so that the support layer of material supports the particle loaded, fibrous sheet material in the spiral configuration.

6. The method of claim 5, wherein the support layer of material is a wire screen.

7. The method of claim 6, wherein the wire screen is stainless steel.

8. The method of claim 5, wherein the support layer of material is a nonwoven polymeric web.

9. The method of claim 5, wherein the support layer of material is a polymeric scrim material.

10. The method of claim 1, wherein the step of providing a solid phase extraction article further comprises providing a porous, particle loaded sheet material comprising fibrillated polytetrafluoroethylene.

11. The method of claim 1, wherein the step of providing a solid phase extraction article further comprises providing a porous, particle loaded sheet material comprising a nonwoven web selected from the group consisting of polyamide, polyolefin, polyester, polyurethane, polyvinylhalide, glass fibers, ceramic fibers, quartz fibers.

12. The method of claim 11, wherein the nonwoven web comprises a fibrous pulp.

13. The method of claim 12, wherein fibers of the fibrous pulp are selected from the group consisting of polyethylene, polypropylene, polyamides, aramids, polyacrylonitrile, cellulose and glass.

14. The method of claim 1, wherein the sheet material further comprises active particles enmeshed in a porous fibrous membrane.

15. The method of claim 14, wherein the active particles are at least one of carbon, an organic compound, a polymer, an inorganic oxide, an ion exchange particle, and a chelating particle.

16. The method of claim 14, wherein the active particles are carbon.

17. The method of claim 14, wherein the active particles are poly(styrene-co-divinylbenzene).

18. The method of claim 14, wherein the active particles comprise a covalently bonded functional coating.

19. The method of claim 18, wherein the active particles comprise covalently bonded aliphatic groups.

20. The method of claim 19, wherein the covalently bonded aliphatic groups are at least one of $C_2H_5$, $C_4H_9$, $C_8H_{17}$, and $C_{18}H_{37}$.

21. The method of claim 14, wherein the active particles are at least one of silica, alumina, titania, and zirconia.

22. The method of claim 21, wherein the active particles are silica.

23. A method of removing dissolved species from a fluid while allowing suspended solid particles to remain within in the fluid, the fluid including dissolved species and suspended solid particles, comprising the steps of:

providing a solid phase extraction article comprising a first end, a second end opposite the first end, a longitudinal axis extending from the first end to the second end, and a porous, particle loaded, fibrous sheet material formed into a pleated configuration to provide multiple layers of sheet material, wherein each layer of sheet material is spaced from each adjacent layer of sheet material, wherein the sheet material comprises a first working surface, a second working surface opposite the first working surface, a first edge perpendicular to the first working surface, a second edge perpendicular to the second working surface and opposite the first edge, and an inner portion comprising active particles between the first and second working surfaces, and wherein the first edge of the sheet material faces the first end of the extraction article and the second edge of the sheet material faces the second end of the extraction article;

passing a fluid including dissolved species and suspended solid particles through the solid phase extraction article from the first end to the second end in an axial direction, wherein the suspended solid particles do not substantially obstruct the first or second working surfaces so that the fluid including dissolved species can reach the inner portion of the sheet material and wherein fluid contacts both the first and second working surfaces of the sheet material and active particles contained within the sheet material remove the dissolved species from the fluid as the fluid passes through the solid phase extraction article.

24. The method of claim 23, wherein the provision of a solid phase extraction article further comprises inserting the sheet material into a housing.

25. The method of claim 23, wherein the step of providing a solid phase extraction article further comprises attaching a support layer of material to the particle loaded, fibrous sheet material so that the support layer of material supports the particle loaded, fibrous sheet material in the pleated configuration.

26. The method of claim 25, wherein the support layer of material is a wire screen.

27. The method of claim 25, wherein the support layer of material is a nonwoven polymeric web.

28. The method of claim 25, wherein the support layer of material is a polymeric scrim material.

29. A method of removing dissolved species from a fluid while allowing suspended solid particles to remain within in the fluid, the fluid including dissolved species and suspended solid particles, comprising the steps of:

providing a solid phase extraction article comprising a first end, a second end opposite the first end, a longitudinal axis extending from the first end to the second end, and a plurality of porous, particle loaded, fibrous sheets, wherein each sheet is parallel to and spaced from an adjacent sheet, wherein each sheet comprises a first working surface, a second working surface opposite the first working surface, a first edge perpendicular to the first working surface, a second edge perpendicular to the second working surface and opposite the first edge, and an inner portion comprising active particles between the first and second working surface, and wherein the first edge of each sheet faces the first end of the extraction article and the second edge of each sheet faces the second end of the extraction article;

passing a fluid including dissolved species and suspended solid particles through the solid phase extraction article from the first end to the second end in an axial direction, wherein the suspended solid particles do not substantially obstruct the first or second working surfaces so that the fluid including dissolved species can reach the inner portion of the sheet material and wherein fluid contacts both the first and second working surfaces of the sheet material and active particles contained within the sheet material remove the dissolved from the fluid as the fluid passes through the solid phase extraction article.

* * * * *